(12) United States Patent
Toris

(10) Patent No.: US 6,606,815 B1
(45) Date of Patent: Aug. 19, 2003

(54) TROLLING SPOON WITH EXCHANGEABLE COLOR PATTERNS

(76) Inventor: Georgios Toris, Selmedalsvägen 44, S-129 37 Hägersten (SE)

( * ) Notice: Subject to any disclaimer, the term of this patent is extended or adjusted under 35 U.S.C. 154(b) by 0 days.

(21) Appl. No.: 10/129,758

(22) PCT Filed: Nov. 10, 2000

(86) PCT No.: PCT/SE00/02211
§ 371 (c)(1),
(2), (4) Date: May 8, 2002

(87) PCT Pub. No.: WO01/33958
PCT Pub. Date: May 17, 2001

(30) Foreign Application Priority Data

Nov. 10, 1999 (SE) .............................................. 9904058

(51) Int. Cl.⁷ .............................................. A01K 85/00
(52) U.S. Cl. ..................................... 43/42.09; 43/42.33
(58) Field of Search ............................ 43/42.33, 42.09, 43/42.32, 42.34

(56) References Cited

U.S. PATENT DOCUMENTS

| | | | | |
|---|---|---|---|---|
| 1,321,850 A | * | 11/1919 | Rhodes ...................... | 43/42.33 |
| 1,600,652 A | * | 9/1926 | Steenstrup ................. | 43/42.09 |
| 2,213,701 A | * | 9/1940 | Haselwood ................. | 43/42.33 |
| 2,538,171 A | * | 1/1951 | Stroup et al. .............. | 43/42.33 |
| 2,546,772 A | * | 3/1951 | Neff ........................... | 43/42.09 |
| 2,594,673 A | * | 4/1952 | Nichols ...................... | 43/42.33 |
| 2,670,559 A | * | 3/1954 | Webb et al. ................ | 43/42.33 |
| 2,708,806 A | * | 5/1955 | Siebert ....................... | 43/42.33 |
| 2,764,834 A | * | 10/1956 | Klein ......................... | 43/42.33 |
| 2,994,982 A | * | 8/1961 | Murawski .................. | 43/42.09 |
| 3,210,882 A | | 10/1965 | Purdom ..................... | 43/42.33 |
| 3,360,882 A | * | 1/1968 | Belokin, Jr. ............... | 43/42.33 |
| 3,408,764 A | * | 11/1968 | McCurry .................... | 43/42.33 |
| 3,528,189 A | * | 9/1970 | Lilley, Jr. ................... | 43/42.33 |
| 3,913,257 A | * | 10/1975 | Colgan ....................... | 43/42.09 |
| 4,215,506 A | * | 8/1980 | LeBoeuf ..................... | 43/42.33 |
| 4,337,591 A | * | 7/1982 | Gell et al. .................. | 43/42.33 |
| 4,464,857 A | * | 8/1984 | Olszewski ................. | 43/42.33 |
| 4,637,160 A | * | 1/1987 | Biskup ....................... | 43/42.33 |
| 4,676,020 A | * | 6/1987 | Taylor et al. .............. | 43/42.33 |
| 4,700,504 A | * | 10/1987 | Mattison .................... | 43/42.33 |
| 4,745,699 A | * | 5/1988 | Gage .......................... | 43/42.09 |
| 5,036,617 A | * | 8/1991 | Waldrip ..................... | 43/42.33 |
| 5,131,182 A | * | 7/1992 | Ising ......................... | 43/42.33 |
| 5,333,406 A | | 8/1994 | Wylie ......................... | 43/42.09 |
| 5,737,867 A | * | 4/1998 | Tsutsumi et al. .......... | 43/42.33 |
| 5,918,405 A | * | 7/1999 | Marusak et al. ........... | 43/42.09 |
| 6,058,645 A | * | 5/2000 | Lummis ..................... | 43/42.33 |

FOREIGN PATENT DOCUMENTS

EP           6964 A1      3/1979

* cited by examiner

Primary Examiner—Michael J. Carone
Assistant Examiner—Joan M. Olszewski
(74) Attorney, Agent, or Firm—Ostrolenk, Faber, Gerb & Soffen, LLP

(57) ABSTRACT

A trolling spoon comprising a frame with fasteners for hooks and a line and which frame has a plastic cover having a color pattern so that the trolling spoon will imitate a fish. The plastic cover is designed as at least two removable, transparent plastic sides, which are easy to fix in position at the frame by at least one fastening structure on each side, and between the frame and the respective plastic sides there is a colour pattern in the form of colour pattern cards, which are protected in room pockets and easily exchangeable for another color pattern after disassemblage of the trolling spoon, whereby one and the same trolling spoon replaces several variants of trolling spoons and the trolling spoon is re-usable after exchange for new plastic sides when the plastic sides have been bitten to pieces.

10 Claims, 3 Drawing Sheets

TROLLING SPOON WITH EXCHANGEABLE COLOR PATTERNS

Figure 1:
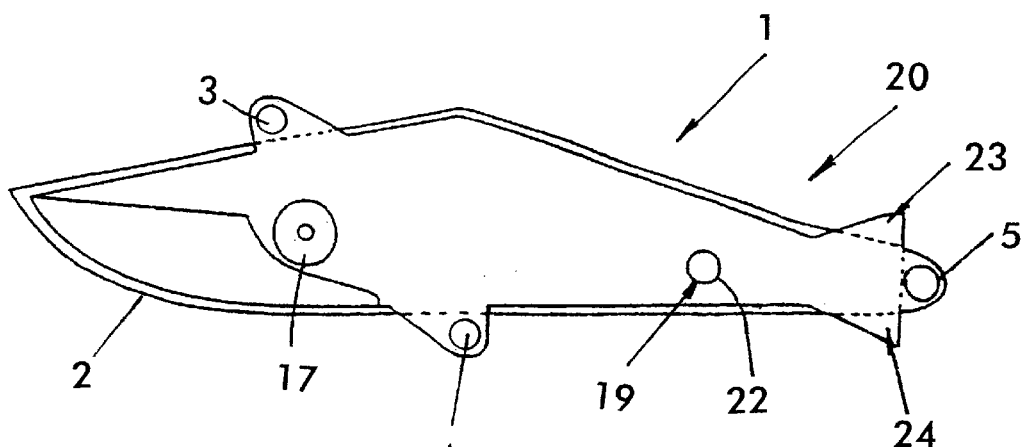

The present invention relates to a trolling spoon comprising a frame with fasteners for hooks and a line and having a plastic cover displaying a colour pattern so that the trolling spoon will imitate a fish. In particular, the trolling spoon according to the present invention relates to a type of trolling spoons called "planing head lures" used when fishing for big game of the sea, preferably wahoo and tuna-fish.

Big game fishermen all over the world today use these fairly new trolling spoons. These trolling spoons are subjected to severe strength by the wahoo and tuna-fish often resulting in that the trolling spoons are crushed under the pressure of the fish jaws and the strong sharp teeth. Current trolling spoons are solid constructions of injection moulded plastic and they have an embedded wire interconnecting the line fastener to the hook fasteners. Trolling spoons of this type are very expensive, about 350–400 SEK for example in the U.S.A. To avoid loosing the trolling spoons as a result of the sharp teeth of the fish, wire tread such as snell is used. The snell is attached to the line fastener of the trolling spoon by a permanent knot or wire lock. The snell or main line are put together with an unlockable bait lock having the consequence that the exchange of trolling spoons can be quite time consuming since you have to rewind the wire which strives to become straight. Current trolling spoons of this type contain significant amount of lead, about 150–300 g, as balancing weight. This is not environmental friendly considering that today you have to discard a trolling spoon after only about 15 wahoo bites in average.

The object of the present invention is to provide a trolling spoon of the type mentioned above which eliminates the disadvantages of prior trolling spoons. The features characterising the invention are stated in the accompanying claims.

Thanks to the present invention a trolling spoon has now been provided which in an excellent manner fulfils its purposes and additionally is reusable and can easily be repaired and converted to different variants of trolling spoons. Another object of the new trolling spoon is that it should be more durable and easier to use than those of similar type currently existing on the market. More benefits come along the durability. Also the environment will be affected in a much less degree since the user never needs to discard a trolling spoon and the trolling spoon according to the invention contains balancing weights of stainless steel. In the long run the new trolling spoon will be substantially cheaper. Furthermore, the trolling spoon according to the invention is easy to use due to lower weight and volume and the trolling spoon can also rapidly be provided with different colour patterns, since there are colour patterns on specific colour pattern cards that may be placed well protected inside the trolling spoon. The trolling spoon is dismountable and consist of two removable plastics sides constituting the body itself with a frame of stainless steel. There are fastening points for the plastic sides on the steel frame in the form of two screw holes, one on each side and there are two pins on each side of the back support of the steel frame functioning as support for the plastic sides. The colour pattern cards are double sided, i.e. they have different patterns on each side and it will be possible to buy these separately and this means that you don't have to buy a trolling spoon for each desirable colour pattern. The plastic sides are transparent and will be available in various colours including fluorescent ones and these will also be possible to be bought separately, which means that you easily may exchange the plastic side that has been worn out or been bitten into pieces whereby you don't need to discard a complete trolling spoon.

Figure 2:
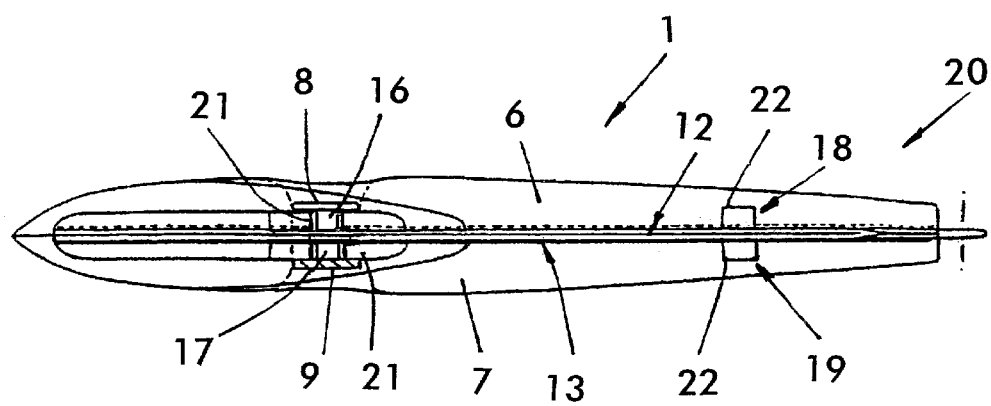
Figure 3:
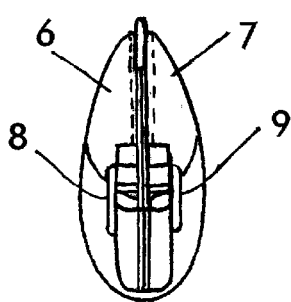
Figure 4:
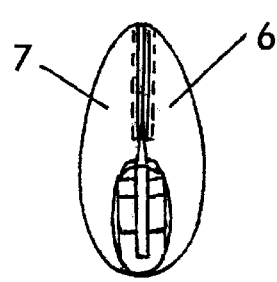
Figure 5:
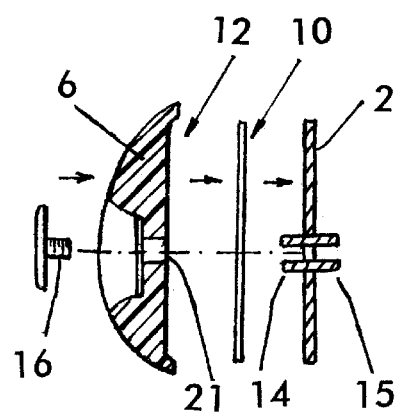
Figure 6:
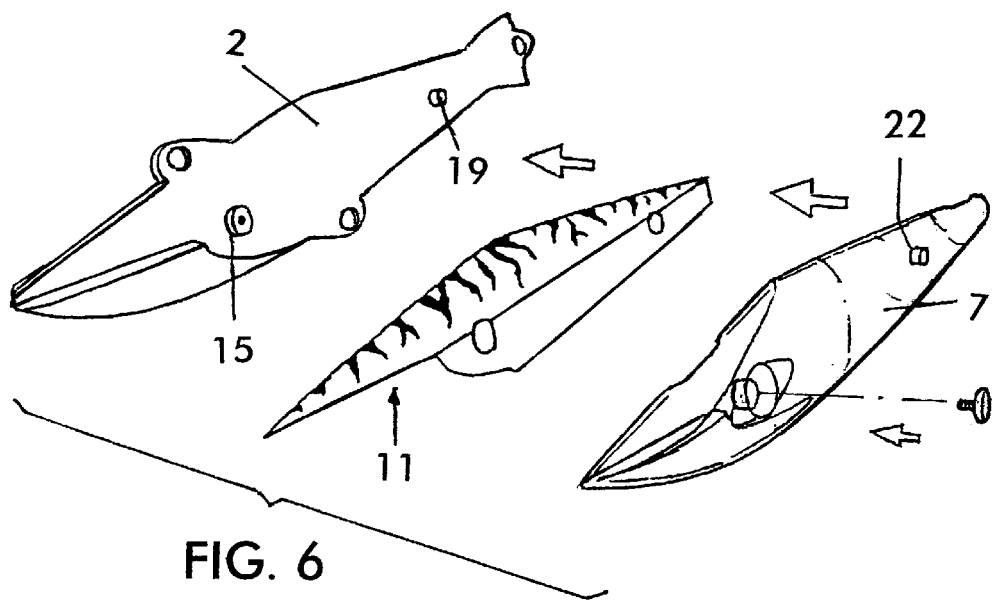

The invention is described in more detail below with the aid of a preferred embodiment with reference to accompanying drawings, in which FIG. 1 shows a side view of a trolling spoon according to the present invention with two plastic sides fixed in position over a steel frame, FIG. 2 shows a top view of the trolling spoon shown in FIG. 1 with a right screw fastener seen in cross-section, FIG. 3 shows the trolling spoon shown in FIGS. 1 and 2 seen from the front, FIG. 4 shows the trolling spoon seen from the back, FIG. 5 shows an exploded view of a screw, a plastic side, a colour pattern card and a steel frame, FIG. 6 shows how the assemblage of the steel frame, colour pattern card, plastic side and screw is to take place.

Figure 7:
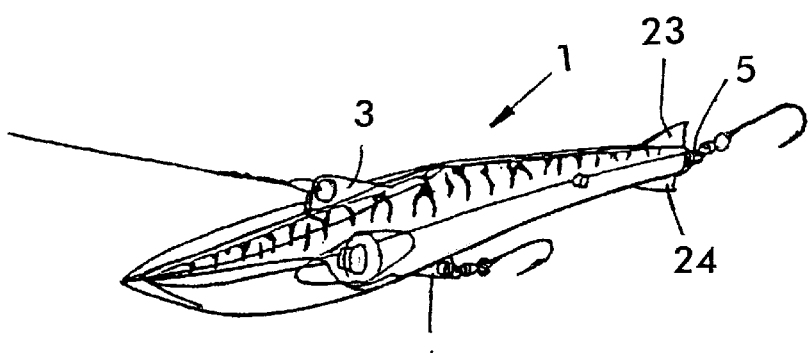
Figure 8:
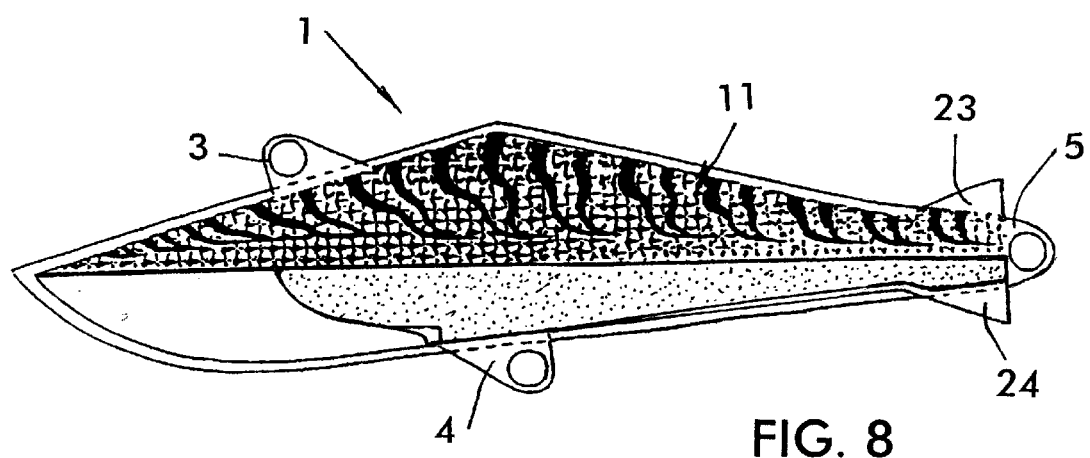
Figure 9A:
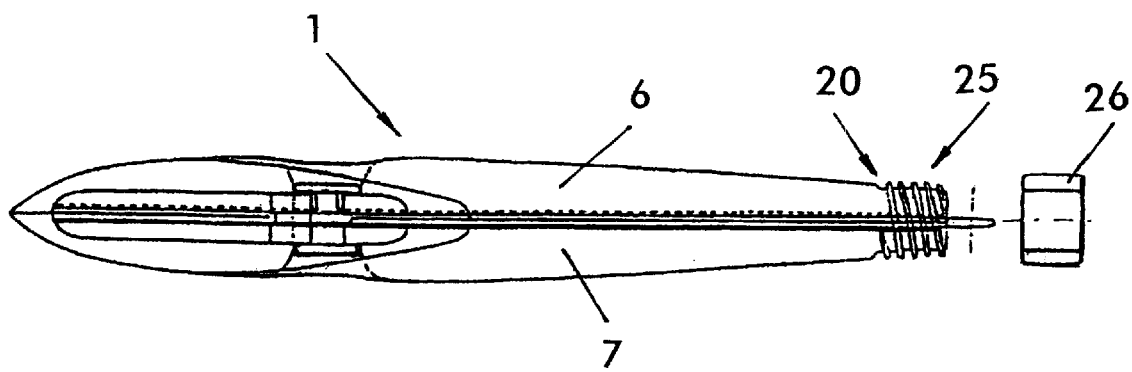
Figure 9B:
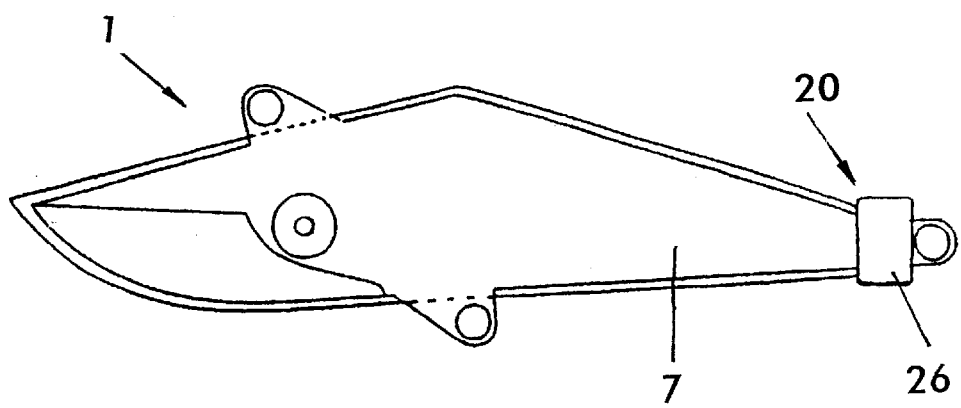
Figure 9C:
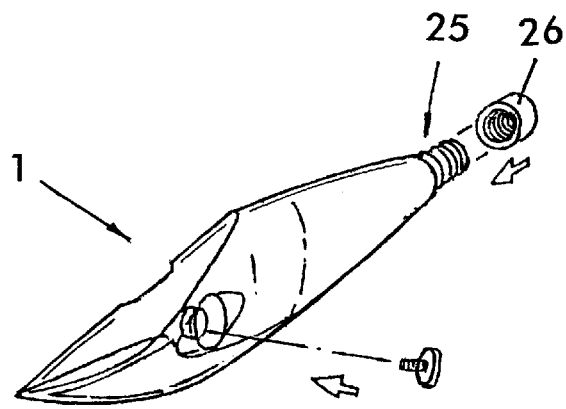

FIG. 7 shows an assembled and ready painted trolling spoon according to the present invention, FIG. 8 shows a side view of a colour pattern card placed against the steel frame of the trolling spoon, and FIGS. 9a–c show three views, top, side and perspective of a modification of the trolling spoon, the rear portion of which has a thread for cooperation with a joining nut sleeve.

As appears from the drawings the trolling spoon 1 according to a preferred embodiment of the invention is constituted by a frame 2 preferably manufactured from steel. The frame 2 has fastenings 3, 4, 5 for hooks and line and is provided with a plastic cover in the form of two removable transparent plastic sides 6, 7. The plastic sides 6, 7 are shaped in such a way that between these and the frame 2 there are room pockets 12, 13, in which coloured pattern cards 10, 11 may be placed and displaying different colour patterns. The two removable transparent plastic sides 6, 7 are easy to position at the frame 2 with the aid of at least one fastening means 8, 9 on each side.

The fastening means 8, 9 are constituted by screw fasteners 14, 15 projecting from the frame 2 and intended to co-operate with screws 16, 17, which retain the plastic sides 6, 7 against the frame 2. The fastening means 8, 9 are supplemented by at least one pin 18, 19 on each side of the back portion 20 of the frame 2, wherein the pins 18, 19 function as support for the plastic sides 6, 7 during as well as after the assemblage of these against the frame 2. During assemblage of the trolling spoon 1 the plastic sides 6, 7 are placed against the frame 2, so that screw holes and pins are positioned in intended recesses and/or holes 21, 22 in the plastic sides. By means of screws, for example socket head-cap type of screws, the plastic sides are then secured on the steel frame. The screw holes 21 and pins 18, 19 extending into their holes 22 in the respective plastic sides have also the function to fix the colour patter cards 10, 11 before the plastic sides 6, 7 have been mounted. The plastic sides 6, 7 completely enclose the frame 2 except for the fasteners 3–5 for hooks and line and two small fins 23, 24 projecting from the end. At the front end of the frame there are also balancing weights 27, 28 of stainless steel attached for accurate balancing of the trolling spoon 1. The colour pattern cards 10, 11 may also be double sided with different patterns on each side.

The steel body or frame 2 may be constituted by acid proof steel of 3 mm thickness and be almost impossible to destroy. Thanks to the exchangeability of the colour pattern cards and the plastic sides you may thus easily renew your trolling spoon for an almost unlimited time.

In FIG. 9 there is shown a modification of the plastic sides 6, 7 where the back portion 20 has a thread 25 to form a screw end, on which you may screw a nut sleeve 26, whereby a stronger attachment for the back ends of the plastic sides 6, 7 is obtained. This may be needed if you for example choose to move forwards the front attachment points for the plastic sides 6, 7. Whichever you choose the back support pins 18, 19 are now no longer needed.

What is claimed is:

1. A trolling spoon, comprising a frame (2) with fasteners (3, 4, 5) for hooks;

a line in which frame (2) has a plastic cover (6, 7) having a colour pattern so that the trolling spoon will imitate a fish, characterized in that the plastic cover is designed as at least two removable transparent plastic sides (6, 7) which are easy to fix in position at the frame (2) by at least one fastening means (8, 9) on each side of a front portion of the frame (2) and there is a colour pattern in the form of colour pattern cards (10, 11), which are protected in room pockets (12, 13) and are easily exchangeable to another colour pattern after disassemblage of the trolling spoon (11); wherein the fastening means (8,9) are constituted by screw fasteners (14, 15) projecting from the frame (2) and co-operate with screws (16, 17) that retain the plastic sides (6, 7) against the frame (2).

2. A trolling spoon according to claim 1, characterized in that the fastening means (8, 9) are supplemented by at least one pin (18, 19) on each side of the back portion (20) of the frame (2), which are functioning as support for the plastic sides (6, 7).

3. A trolling spoon according to claim 2, characterized in that the plastic sides (6, 7) have recesses (21) at a front portion for co-operating with the screw fasteners (14, 15) and screws (16, 17), and additional recesses (22) at a back portion which cooperate with the pins (18, 19) projecting at the back portion of the frame (2) during and after the assemblage of the trolling spoon (1).

4. A trolling spoon according to claim 1, characterized in that the plastic sides (6, 7) have recesses (21) at the front portion intended to co-operate with the screw fasteners (14, 15) and screws (16, 17), and additional recesses (22) at a back portion which cooperate with at least one pin (18, 19) projecting at the back portion of the frame (2) during and after the assemblage of the trolling spoon (1).

5. A trolling spoon according to claim 1, characterized in that the frame (2) is made from stainless steel, the front end of which is provided with attached balancing weights of stainless steel.

6. A trolling spoon according to claim 1, characterized in that the plastic sides (6, 7) after their assemblage in the frame (2) completely enclose the latter, except for the fasteners (3–5) for hooks and line and two small fins projecting from the back end (20) of the frame (2).

7. A trolling spoon according to claim 1, characterized in that the colour pattern cards (10, 11) are double sided with different patterns on each side.

8. A trolling spoon according to claim 1, characterized in that the back portion (20) of the plastic sides (6, 7) is provided with a thread (25) on the outside for co-operation with a nut sleeve (26) for keeping the plastic sides (6, 7) together.

9. A trolling spoon according to claim 1, characterized in that the fastening means (8, 9) are supplemented by at least one pin (18, 19) on each side of the back portion (20) of the frame (2), which are functioning as support for the plastic sides (6, 7).

10. A trolling spoon according to claim 9, characterized in that the plastic sides (6, 7) have recesses (21) at a front portion for co-operating with the screw fasteners (14, 15) and screws (16, 17), and additional recesses (22) at a back potion which cooperate with the pins (18, 19) projecting at the back portion of the frame (2) during and after the assemblage of the trolling spoon (1).

\* \* \* \* \*